United States Patent
Guo et al.

(10) Patent No.: US 10,270,516 B2
(45) Date of Patent: Apr. 23, 2019

(54) TIMING A RANDOM ACCESS UE TO RELAY AP

(71) Applicant: Telefonaktiebolaget LM Ericsson (publ), Stockholm (SE)

(72) Inventors: Zhiheng Guo, Beijing (CN); Rui Fan, Beijing (CN); Qianxi Lu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 15/532,319

(22) PCT Filed: Dec. 31, 2014

(86) PCT No.: PCT/CN2014/095882
§ 371 (c)(1),
(2) Date: Jun. 1, 2017

(87) PCT Pub. No.: WO2016/106676
PCT Pub. Date: Jul. 7, 2016

(65) Prior Publication Data
US 2017/0302359 A1 Oct. 19, 2017

(51) Int. Cl.
*H04B 7/155* (2006.01)
*H04W 56/00* (2009.01)
(Continued)

(52) U.S. Cl.
CPC ........ *H04B 7/155* (2013.01); *H04W 56/0045* (2013.01); *H04W 74/08* (2013.01); *H04W 84/047* (2013.01); *H04W 92/12* (2013.01)

(58) Field of Classification Search
CPC .. H04B 7/155; H04W 56/0045; H04W 92/12; H04W 84/047
See application file for complete search history.

(56) References Cited

U.S. PATENT DOCUMENTS 7,587,176 B2 * 9/2009 Yu ............................ H04B 1/406
455/78
2010/0222068 A1 9/2010 Gaal et al.
(Continued)

FOREIGN PATENT DOCUMENTS

| CN | 101416556 A | 4/2009 |
| CN | 102724766 B | 3/2016 |
| WO | WO 2012 119626 A1 | 9/2012 |

OTHER PUBLICATIONS

PCT Written Opinion of the International Searching Authority; PCT Notification of Transmittal of the International Search Report and the Written Opinion of the International Searching Authority, or the Declaration for International application No. PCT/CN2014/095882—dated Oct. 9, 2015.
(Continued)

*Primary Examiner* — Mohammad S Anwar
(74) *Attorney, Agent, or Firm* — Sage Patent Group (57) ABSTRACT

The embodiments disclose a method in a relay AP for timing a random access of a UE to the relay AP in a TDD radio communication network. The relay AP performs a self-backhaul over a backhaul link to a donor AP. The backhaul link and the random access link between the relay AP and the UE share a same frequency resource. The method comprises obtaining a first propagation delay information from the donor AP to the relay AP over the backhaul link; determining a timing advance offset for the UE to perform the random access at least based on the first propagation delay information; and transmitting the timing advance offset to the UE.

12 Claims, 12 Drawing Sheets

(51) Int. Cl.
*H04W 74/08* (2009.01)
*H04W 84/04* (2009.01)
*H04W 92/12* (2009.01)

(56) References Cited

U.S. PATENT DOCUMENTS

2011/0222428 A1* 9/2011 Charbit .............. H04B 7/15557
 370/252
2014/0301375 A1 10/2014 Nusairat et al.

OTHER PUBLICATIONS

TSG-RAN WG1 Meeting #59b; Valencia, Spain; Source: LG Electronics Inc.; Title: Further Consideration on Timing Alignment (R1-100229)—Jan. 18-22, 2010.
3GPP TSG RAN WG1 #60 meeting; San Francisco, USA; Source: Mitsubishi Electric; Title: Guard periods and timing for backhauling in Type 1 relays (R1-101457)—Feb. 22-26, 2010.
TSG-RAN WG1 Meeting #57bis; Los Angeles, USA; Source: LG Electronics Inc.; Title: Guard time handling in backhaul link design (R1-092494)—Jun. 29-Jul. 3, 2009.
Extended European Search Report for Application No./Patent No. 14909485.6—1220 / 3241399 PCT/CN2014095882—dated Jul. 18, 2018.

* cited by examiner

TIMING A RANDOM ACCESS UE TO RELAY AP

PRIORITY

This nonprovisional application is a U.S. National Stage Filing under 35 U.S.C. § 371 of International Patent Application Serial No. PCT/CN2014/095882 filed Dec. 31, 2014, and entitled "Timing A Random Access Of UE To Relay AP."

TECHNICAL FIELD

The present technology relates to the field of communication, particularly to a method in a relay access point (AP) for timing a random access of a user equipment (UE) to the relay AP in a time division duplex (TDD) radio communication network. The technology also relates to a relay AP and a computer readable storage medium for performing the method.

BACKGROUND

Figure 1:
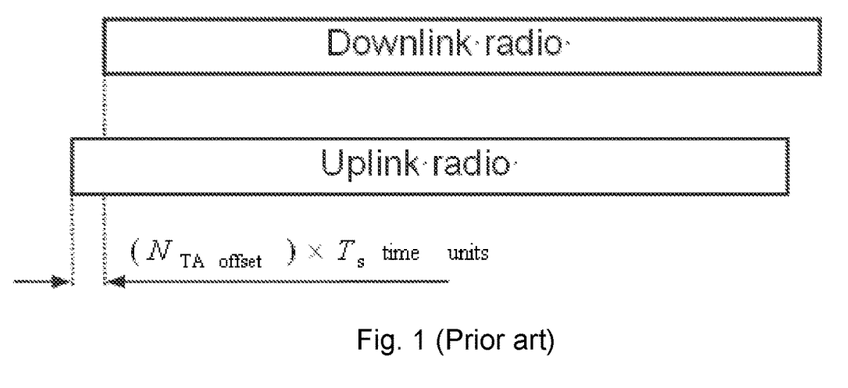
FIG. 1 illustrates a fixed timing advance offset for the random access.

In the time division duplex (TDD) radio communication network such as TDD long term evolution (LTE), there is an inevitable propagation delay between the access point (AP) and the user equipment (UE). When performing UL transmission to the AP, the UE is required to set a timing advance offset. Traditionally, for the very first UL transmission, i.e., the transmission of the physical random access channel (PRACH), the UE is set a fixed timing advance offset $N_{TA\ offset}$ in hardware to handle the downlink-to-uplink switching time as illustrated in FIG. 1, which however doesn't cover the variance of DL and UL timing difference at AP side, which is assumed to be fixed as zero or small enough to be ignored.

However, with the introduction of the self-backhaul in the TDD radio communication system, one or more relay APs exist between the donor AP and the UE to relay the random access request from the UE to the donor AP, which is motived by the more limited coverage of a single hop when higher frequency band is applied to the backhaul link, e.g., using millimeter wavelength frequency. In this case, the accumulated propagation delay between the donor AP and the UE is hard to be ignored. If the accumulated propagation delay is not taken into account when the UE sends a random access request to the relay AP through the PRACH, the random access request will arrive at the relay AP later than expected and thus probably miss the time slot assigned for the relay AP to receive the random access request. Hence, the PRACH transmission timing error may cause failure in the random access procedure. In addition, due to the delay, the random access request may arrive at the relay AP overlapping with the time slot afterwards which is scheduled to perform reception for other channels such as physical uplink shared channel (PUSCH) transmission. As such, the undesirable interference occurs.

SUMMARY

It's an object of the present disclosure to resolve or alleviate at least one of the problems mentioned above.

A first aspect of the present disclosure relates to a method in a relay AP for timing a random access of a UE to the relay AP in a TDD radio communication network. The relay AP performs a self-backhaul over a backhaul link to a donor AP. The backhaul link and the random access link between the relay AP and the UE share a same frequency resource. The method comprises obtaining a first propagation delay information from the donor AP to the relay AP over the backhaul link; determining a timing advance offset for the UE to perform the random access at least based on the first propagation delay information; and transmitting the timing advance offset to the UE.

Instead of a fixed timing advance offset set in the hardware of the UE, by taking the propagation delay from the donor AP to the relay AP into account, the timing advance offset for the UE can be set as appropriate, thereby avoiding the potential random access failure.

A second aspect of the present disclosure relates to a computer readable storage medium storing instructions which, when run on a relay AP, cause the relay AP to perform the steps of the method as described above.

A third aspect of the present disclosure relates to a method in a UE for timing a random access to a relay AP in a TDD radio communication network. The relay AP performs a self-backhaul over a backhaul link to a donor AP. The backhaul link and the random access link between the relay and the UE share a same frequency resource. The method comprises receiving a timing advance offset from the relay AP, the timing advance offset is associated with a propagation delay information from the donor AP to the relay AP over the backhaul link; and determining a starting time point, within a guard period (GP) at a downlink-to-uplink switching point, to perform the random access based on the timing advance offset.

A fourth aspect of the present disclosure relates to a computer readable storage medium storing instructions which, when run on a UE, cause the UE to perform the steps of the method as described above.

A fifth aspect of the present disclosure relates to a relay AP configured to time a random access of a UE to the relay AP in a TDD radio communication network. The relay AP performs a self-backhaul over a backhaul link to a donor AP. The backhaul link and the random access link between the relay AP and the UE share a same frequency resource. The relay AP comprises an obtaining unit, a first determining unit and a transmitting unit. The obtaining unit is adapted to obtain a first propagation delay information from the donor AP to the relay AP over the backhaul link. The first determining unit is adapted to determine a timing advance offset for the UE to perform the random access at least based on the first propagation delay information. The transmitting unit is adapted to transmit the timing advance offset to the UE.

A sixth aspect of the present disclosure relates to a UE configure to time a random access to a relay AP in a TDD radio communication network. The relay AP performs a self-backhaul over a backhaul link to a donor AP. The backhaul link and the random access link between the relay AP and the UE share a same frequency resource. The UE comprises a first receiving unit and a second determining unit. The first receiving unit is adapted to receive a timing advance offset from the relay AP, the timing advance offset is associated with a propagation delay information from the donor AP to the relay AP over the backhaul link. The second determining unit is adapted to determine a starting time point, within a guard period at a downlink-to-uplink switching point, to perform the random access based on the timing advance offset.

A seventh aspect of the present disclosure relates to a relay AP configured to time a random access of a UE to the relay AP in a TDD radio communication network. The relay AP performs a self-backhaul over a backhaul link to a donor AP. The backhaul link and the random access link between the relay AP and the UE share a same frequency resource. The relay AP comprises a processor and a memory. The memory contains instructions executable by the processor whereby the relay AP is operative to obtain a first propagation delay information from the donor AP to the relay AP over the backhaul link, determine a timing advance offset for the UE to perform the random access at least based on the first propagation delay information, and transmit the timing advance offset to the UE An eighth aspect of the present disclosure relates to a UE configure to time a random access to a relay AP in a TDD radio communication network. The relay AP performs a self-backhaul over a backhaul link to a donor AP. The backhaul link and the random access link between the relay AP and the UE share a same frequency resource. The relay AP comprises a processor and a memory. The memory contains instructions executable by the processor whereby the UE is operative to receive a timing advance offset from the relay AP, the timing advance offset is associated with a propagation delay information from the donor AP to the relay AP over the backhaul link; and to determine a starting time point, within a guard period at a downlink-to-uplink switching point, to perform the random access based on the timing advance offset.

BRIEF DESCRIPTION OF THE DRAWINGS

The technology will be described, by way of example, based on embodiments with reference to the accompanying drawings, wherein.

DETAILED DESCRIPTION

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as AP, it should be understood that the embodiments are not limited to those specific terms but may be applied to all similar entities, such as base station, macro base station, femto base stations, Core Network (CN), NodeB, eNodeB etc.

Embodiments herein will be described below with reference to the drawings.

Figure 2:
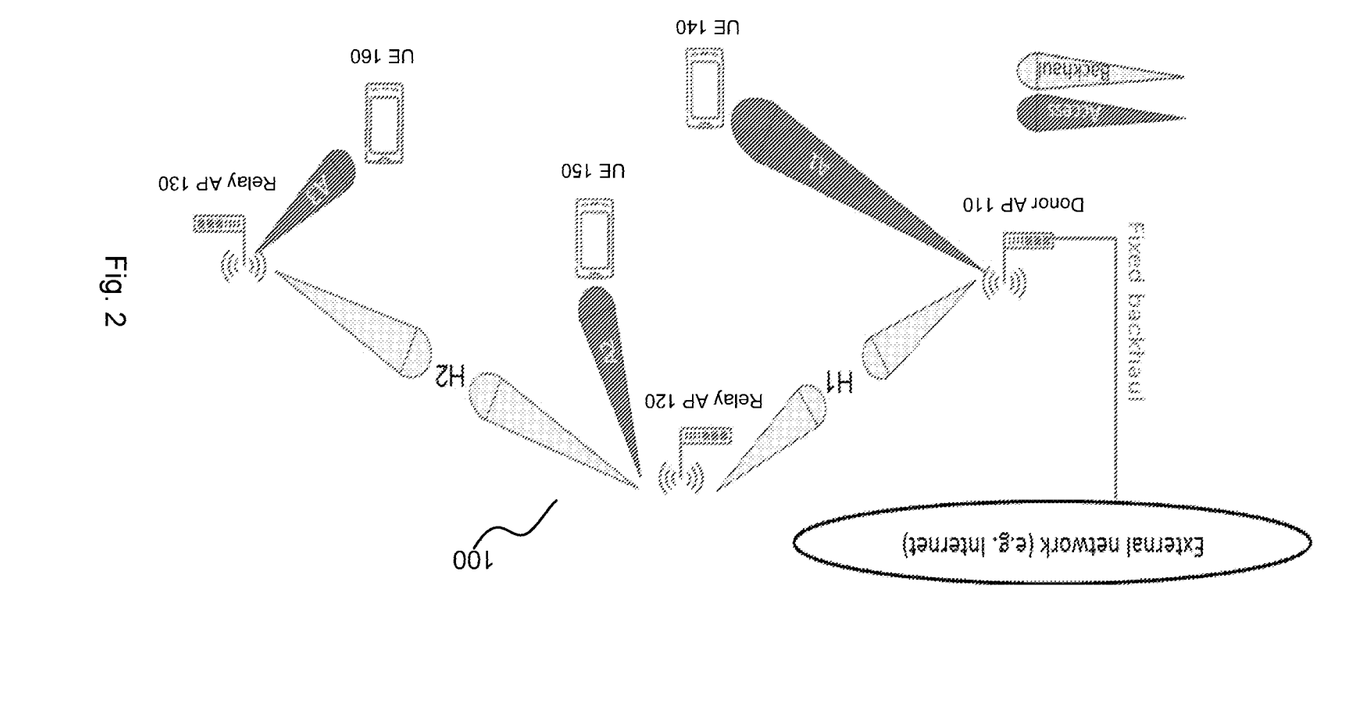
FIG. 2 schematically illustrates an exemplary radio communication network environment that is suitable for implementing the embodiments of the present disclosure.

FIG. 2 schematically illustrates an exemplary radio communication network environment 100 that is suitable for implementing the embodiments of the present disclosure. As shown, the radio communication network 100 includes a donor AP 110, a relay AP 120 and a relay AP 130. The donor AP 110 has a wired connection with core network such as evolved packet core, or external network such as the Internet, and can perform a fixed-line backhaul to the external network. By contrast, the relay APs 120 and 130 don't have wired connection with the external network, and thus have to perform a self-backhaul wirelessly and finally route to the core or external network via the donor AP 110. For example, for the relay AP 120, the backhaul link has one hop from the relay 120 to the donor 110. For the relay AP 130, the backhaul link has two hops from the relay 130 to the relay 120 then to the donor AP 110. The relay APs can be either fixed or the deployment of those APs could be adjusted according to for example data throughput or capacity of the network. In some scenarios, the relay APs could also possibly be mobile APs. The UEs access the radio communication network via different APs. For example, the UE 140 accesses the donor AP 110, the UE 150 accesses the relay AP 120, and the UE 160 accesses the relay AP 130.

The UE may be any device intended for accessing services via an access network and configured to communicate over the access network. For instance, the UE may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The UE may be a portable, pocket-storable, hand-held, computer-comprised, or vehicle-mounted mobile device, enabled to communicate voice and/or data, via a wireless or wireline connection.

Here, the backhaul link between the relay AP and the donor AP and the random access link between the relay AP and the UE share a same frequency resource. In other words, the self-backhaul by the relay AP and the random access by the UE will share the same time and frequency resources.

It should be appreciated that the donor AP and the relay APs in the radio communication network 100 are shown by way of example, and the network 100 can includes one or more donor AP and relay APs as desired.

Figure 3:
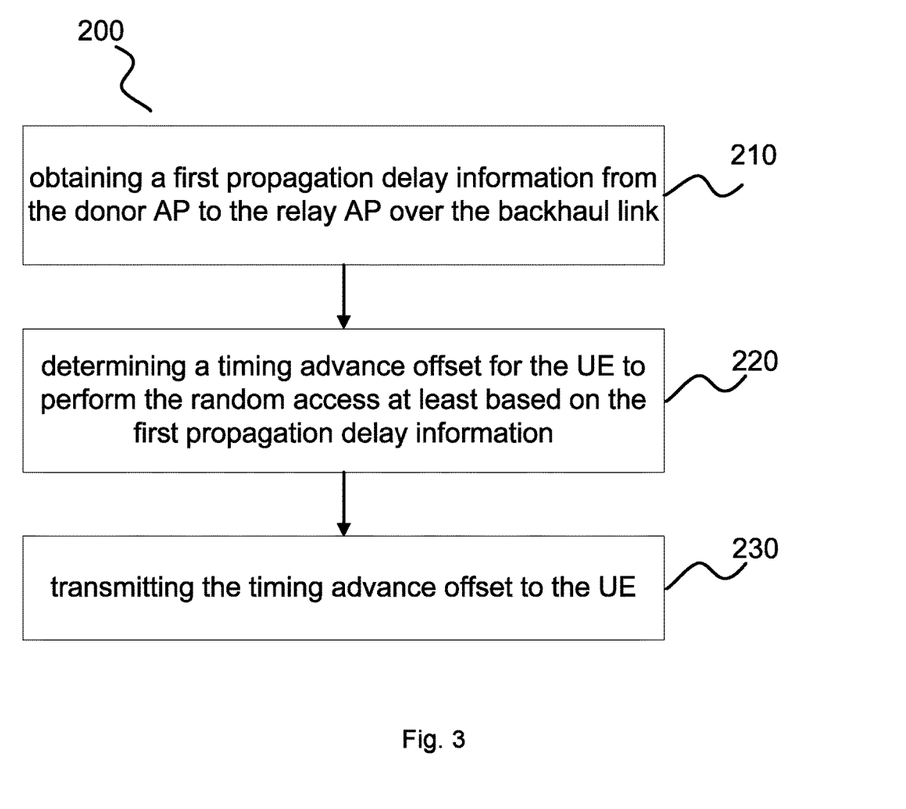
FIG. 3 schematically illustrates a flowchart of a method for timing a random access of the UE to the relay AP in accordance with an embodiment.

FIG. 3 schematically illustrates a flowchart of a method 200 in a relay AP for timing a random access of the UE to the relay AP in accordance with an embodiment. Now the process of the embodiment will be described in detail with reference to the FIG. 3.

In block 210, the relay AP obtains a first propagation delay information from the donor AP to the relay AP over the backhaul link.

Figure 4:
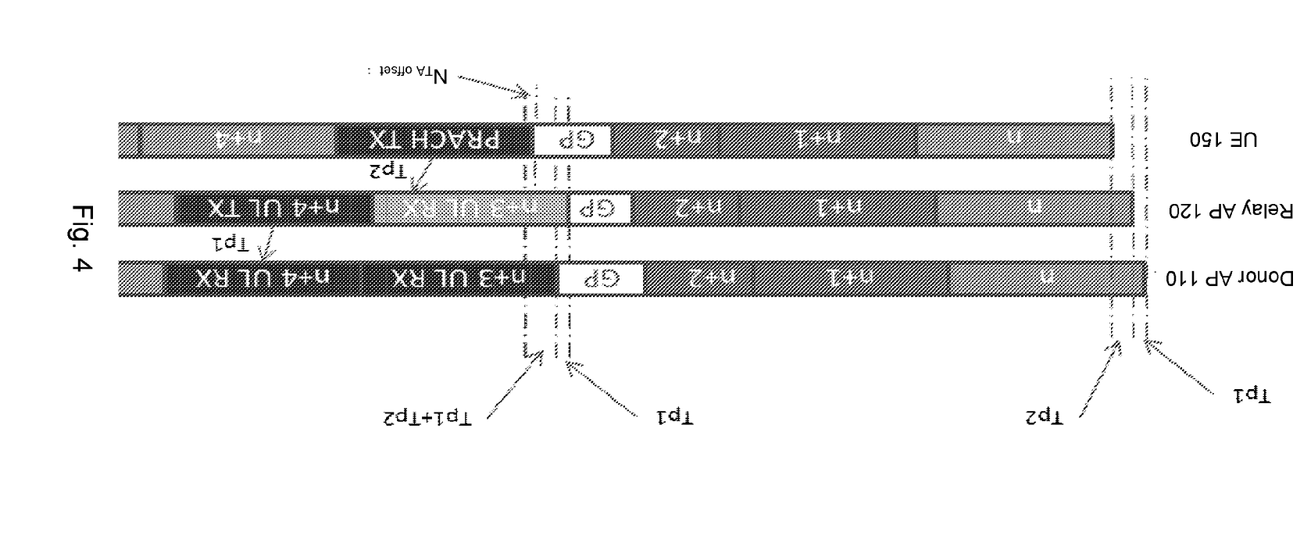
FIG. 4 schematically illustrates the frame timings for the random access in the radio communication network environment.

Take the relay 120 as example, as illustrated in FIG. 4, the donor 110 performs the downlink transmission to the relay AP 120, and then the relay AP 120 performs downlink transmission to the UE 150, for example broadcasting to the UE 150. Then, after a guard period, the downlink transmission is switched to the uplink transmission and the UE 150 is to perform random access to the relay AP 120. Typically, the relay AP 120 obtains the propagation delay information from the donor AP 110 to the relay AP 120 during the downlink transmission. In particular, after the relay AP 120 receives a downlink transmission packet from the donor AP 110, the relay AP 120 performs a backhaul to the donor AP 110, the backhaul carries the time of reception for the packet. In this way, the donor AP 110 can determine the propagation delay to the relay AP 120 by comparing the receipt time of the packet with the transmitting time, and then notify the relay AP 120 of the propagation delay, i.e. Tp1.

In block 220, the relay AP determines a timing advance offset for the UE to perform the random access at least based on the first propagation delay information. For example, the relay AP can make the timing advance offset equal to twice of the propagation delay in the first propagation delay information, on the hypothesis that downlink propagation delay roughly equal to uplink propagation delay, i.e. 2*Tp1. Alternatively, if there is a fixed timing advance offset for the UE's PRACH transmission configured in the hardware of the UE, the timing advance offset can be set as twice of the propagation delay in the first propagation delay information minus the fixed timing advance offset, i.e. $2*Tp1-N_{TA\ offset}$. In the following embodiments, the first alternative has been taken as an example, but other alternatives would also apply.

In block 230, the relay AP informs the determined timing advance offset to the UE. For example, the relay AP can broadcast the timing advance offset to the UE by the access information table, the radio resource control signaling or the medium access control signaling.

By taking the propagation delay from the donor AP to the relay AP into account, the timing advance offset for the UE can be set as appropriate. As such, the random access request from the UE can arrive at the relay AP as expected, thereby avoiding the potential random access failure and channel interference due to improper timing for the random access request.

In order to determine the timing advance offset for the UE more accurately, it is desirable to taking into account the propagation delay between the relay AP and the UE, i.e. Tp2 as illustrated in FIG. 4. Before the random access of the UE to the relay AP, the relay AP has no way to measure the practical propagation delay between the relay AP and the UE. In this case, the relay AP can, for example, keep the historical propagation delay between the relay node and the UEs to which the relay node has broadcasted signaling and utilize the historical propagation delay as the practical propagation delay at this time. In this way, the relay AP can obtain a second propagation delay information from the relay AP to the UE, and determine the timing advance offset for the UE to perform the random access based on the first propagation delay information and the second propagation delay information. For example, the timing advance offset is 2*(Tp1+Tp2).

Figure 5:
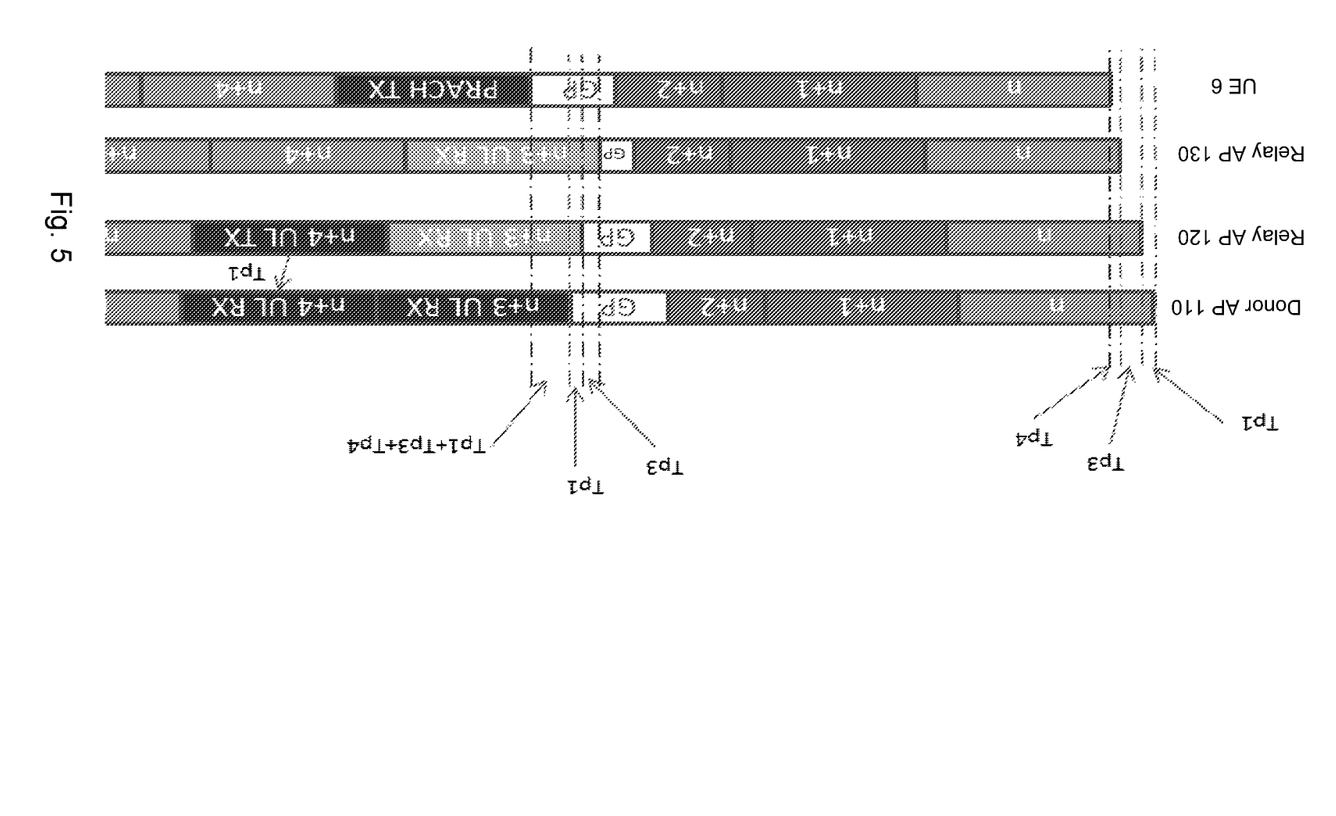
FIG. 5 schematically illustrates the frame timings for the random access in the radio communication network environment.

In addition, it is likely that the backhaul link between the relay AP and the donor AP goes through one or more intermediate relay APs, such as the iii backhaul link between the relay AP 130 to the donor AP 110 in FIG. 2. As shown, the relay AP 130 connects to the donor AP 110 via the relay AP 120. In this case, the first propagation delay information between the donor AP 110 and the relay AP 130 will include the propagation delay between the donor AP 110 and the intermediate relay AP 120 and the propagation delay between the intermediate relay AP 120 to the relay AP 130. Hence, the AP 130 will calculate an accumulated propagation delay of the first propagation delay information, and then determine the timing advance offset for the UE 160 as twice of the accumulated propagation, for example 2*(Tp1+Tp3) as illustrated in FIG. 5.

Furthermore, the relay AP can periodically repeat the actions above to update the timing advance offset to UE.

This is advantageous when the relay AP is a mobile AP. Due to the mobility of the relay AP, the propagation delay between the relay AP and the donor AP is variable. Hence, it is necessary to update the timing advance offset to UE.

Figure 6:
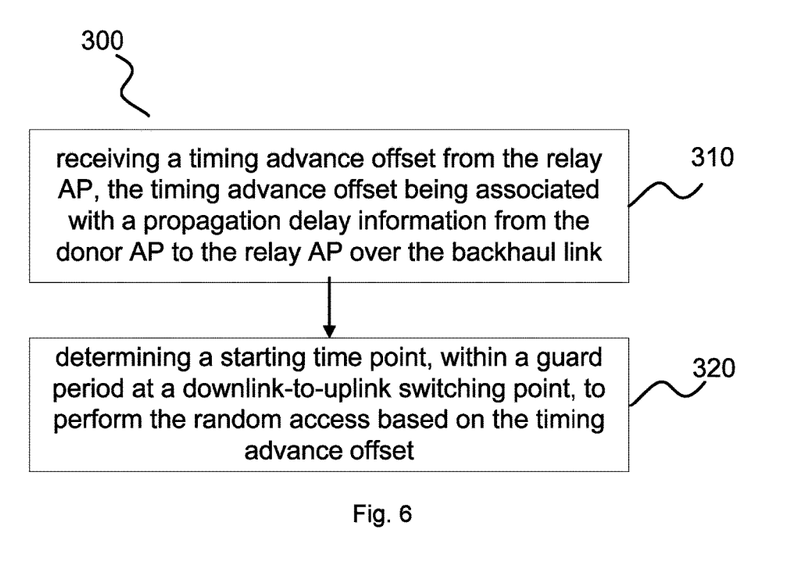
FIG. 6 schematically illustrates a flowchart of a method for timing a random access of the UE to the relay AP in accordance with an embodiment.

FIG. 6 schematically illustrates a flowchart of a method 300 in a UE for timing a random access the UE to the relay AP in accordance with an embodiment. Now the process of the embodiment will be described in detail with reference to FIG. 6.

In block 310, the UE receives a timing advance offset indication from the relay AP, the timing advance offset is associated with a propagation delay information from the donor AP to the relay AP over the backhaul link. Take the UE 150 in FIG. 1 as example, the UE 150 would receive the timing advance offset from the relay AP 120, for example, by radio resource control signaling broadcasted by the relay AP 120.

In block 320, the UE determines a starting time point, within a guard period at a downlink-to-uplink switching point, to perform the random access based on the timing advance offset. Specifically, the UE can determine the starting time point to be the timing advance offset earlier than the predetermined starting time point. That is to say, the random access performed by the UE will start the timing advance offset earlier. This will be accomplished by squeezing the length of the guard period at a downlink-to-uplink switching point, as illustrated in FIG. 4 and FIG. 5.

Figure 7:
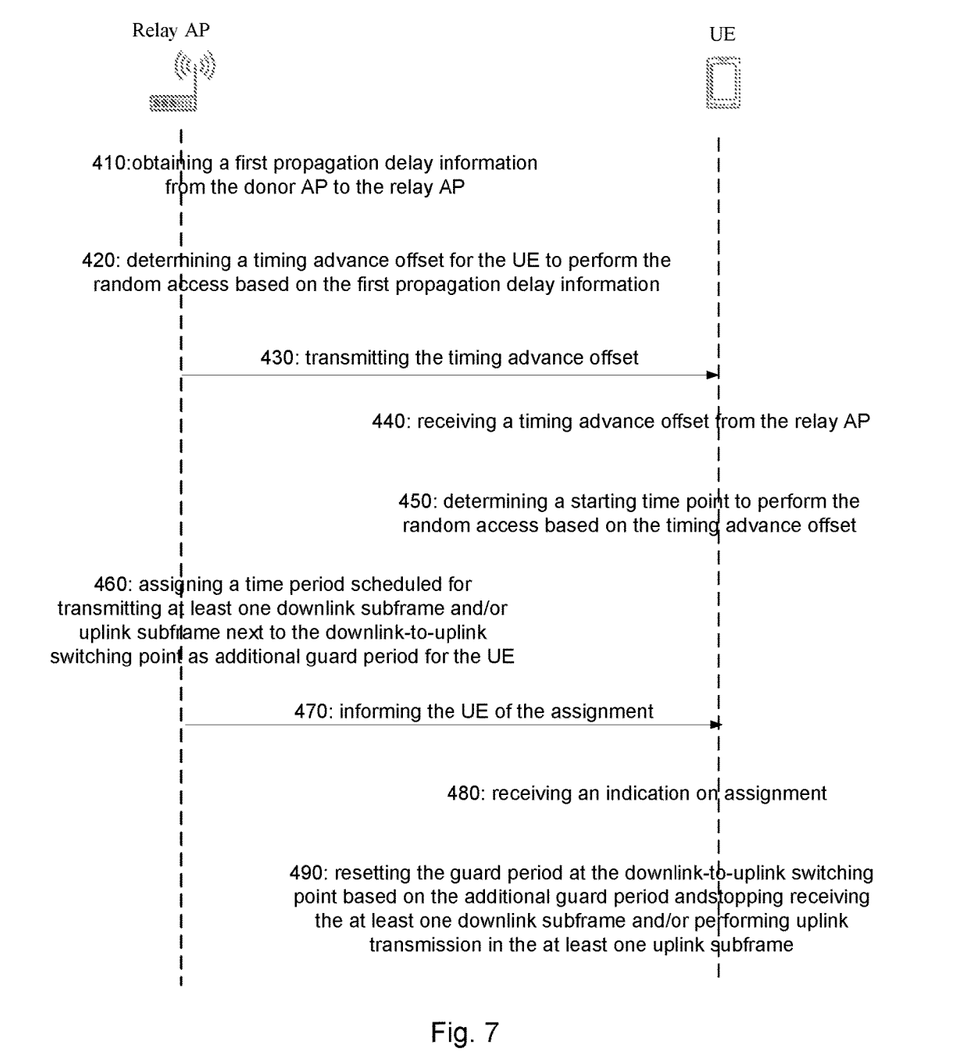
FIG. 7 schematically illustrates a flowchart of a method for timing a random access of the UE to the relay AP in accordance with an embodiment.

FIG. 7 schematically illustrates a flowchart of a method for timing a random access of the UE to the relay AP in accordance with an embodiment. In the embodiment, the steps 410 to 430 work in the same way as the blocks 210 to 230 in FIG. 3, and the steps 440 to 450 work in the same way as the blocks 310 to 320 in FIG. 6. Theses steps will not be described for simplicity. Now the other steps in the embodiment will be described with reference to the FIG. 7.

Figure 8:
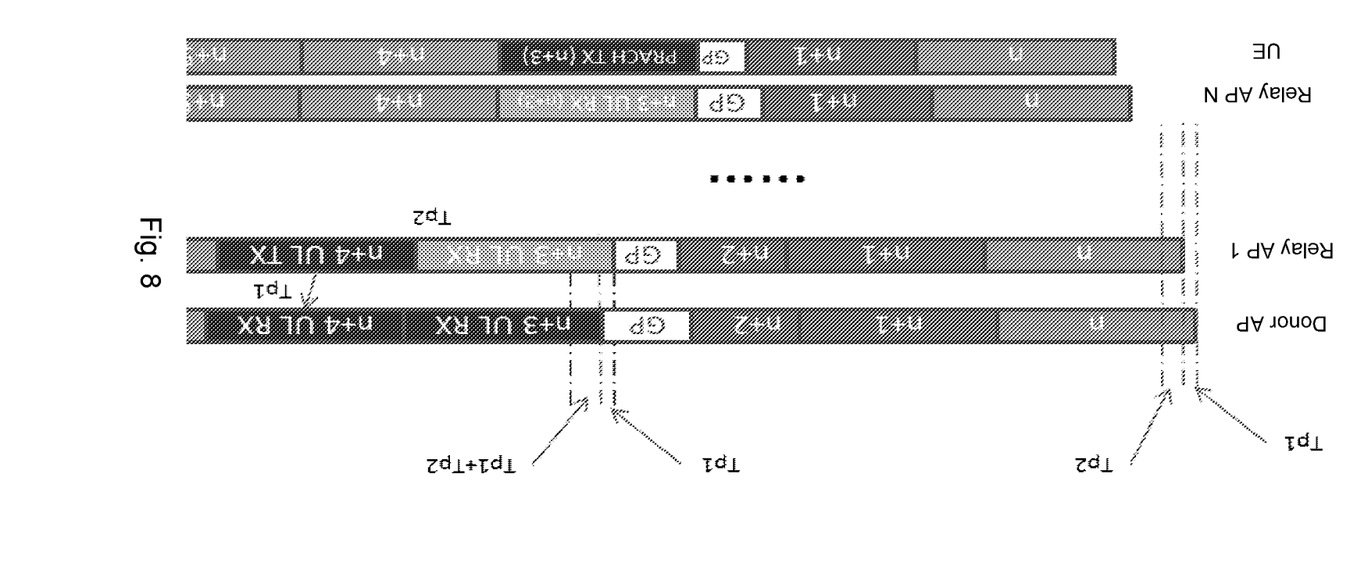
FIG. 8 schematically illustrates the frame timings for the random access in the radio communication network environment.

In some cases, the determined timing advance offset is larger than a length of a guard period for the UE at a downlink-to-uplink switching point. As illustrated in FIG. 8, the backhaul link between the donor AP and the relay AP N goes through N−1 intermediate relay APs, relay AP 1 to replay AP N−1. Therefore, there are N hops from the donor AP to the relay AP N. When there are multiple hops in-between, the accumulated propagation delay from the donor AP to the relay AP N would be very large such that the determined timing advance offset from the accumulated propagation delay is larger than the length of the guard period at the downlink-to-uplink switching point. In this case, the UE will have to initiate an uplink random access request in the time period for the downlink transmission, for example, the downlink transmission subframe n+2, which is inapplicable since the UE can not perform uplink transmission and downlink transmission simultaneously.

To resolve the issue, the relay AP assigns a time period scheduled for transmitting at least one downlink subframe and/or uplink subframe next to the downlink-to-uplink switching point as additional guard period for the UE in step 460 and informs the UE of the assignment in step 470. For example, the relay AP assigns a time period scheduled for transmitting at least one downlink subframe (e.g. the downlink subframe n+2) next to the downlink-to-uplink switching point as additional guard period for the UE. As such, the time period for the downlink subframe n+2 will not be used to transmit the downlink packet. Additionally or alternatively, the relay AP can also assign a time period scheduled for transmitting at least one uplink subframe (e.g. the uplink subframe n+3) next to the downlink-to-uplink switching point as additional guard period for the UE. As such, the time period for the uplink subframe n+3 will not be used to transmit the uplink packet.

In step 480, the UE receives an indication on occupying a time period scheduled for transmitting at least one downlink subframe and/or uplink subframe next to the downlink-to-uplink switching point as additional guard period. In response to receiving the indication, the UE resets the guard period at the downlink-to-uplink switching point based on the additional guard period and stopping receiving the at least one downlink subframe and/or stopping performing uplink transmission in the at least one uplink subframe. Specifically, the UE will make use of the additional guard period to lengthen the length of the guard period. As illustrated in FIG. 8, the new guard period covers the time period originally scheduled for the downlink subframe n+2. In this way, the UE is provided with enough time to set the starting time point for performing the random access within the new guard period. In addition, if the time period scheduled for transmitting the downlink subframe such as subframe n+2 is occupied as additional guard period, the UE will stop receiving this downlink subframe since the AP won't transmit the payload data through this subframe. Also, if the time period scheduled for transmitting the uplink subframe such as subframe n+3 is occupied as additional guard period, the UE will stop performing uplink transmission. The UE may, for example, utilize the next uplink subframe n+4 to transmit the random access request to the relay AP N.

Figure 9:
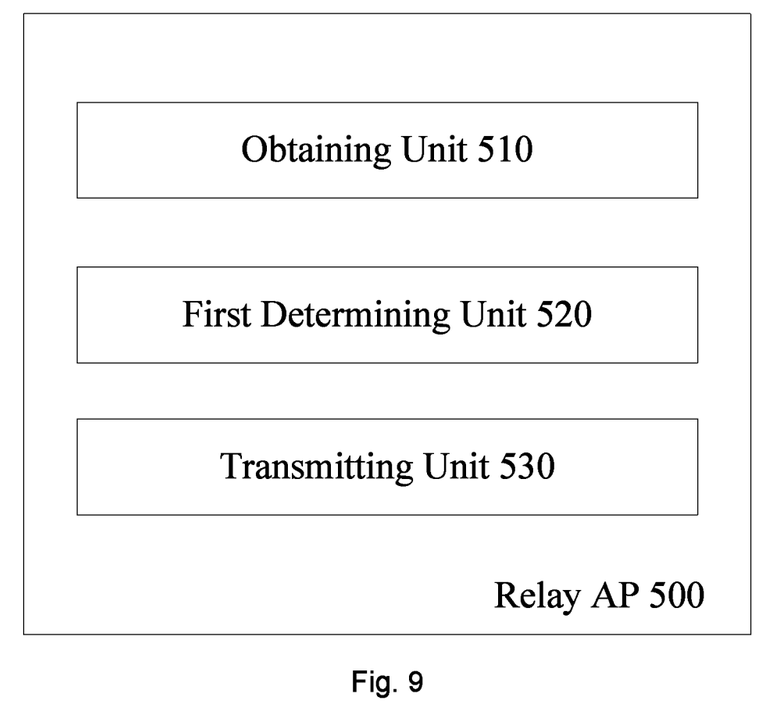
FIG. 9 is a block diagram of a relay AP configured to time a random access of the UE to the relay AP in accordance with an embodiment.

FIG. 9 is a block diagram of a relay AP 500 configured to time a random access of the UE to the relay AP in accordance with an embodiment. The relay AP 500 comprises an obtaining unit 510, a first determining unit 520 and a transmitting unit 530. The relay AP 500 performs a self-backhaul over a backhaul link to a donor AP. Now the individual units will be described with reference to the FIG. 9.

The obtaining unit 510 is adapted to obtain a first propagation delay information from the donor AP to the relay AP over the backhaul link.

The first determining unit 520 is adapted to determine a timing advance offset for the UE to perform the random access at least based on the first propagation delay information.

The transmitting unit 530 is adapted to inform the determined timing advance offset to the UE. For example, the transmitting unit 530 can broadcast the timing advance offset to the UE by the access information table, the radio resource control signaling or the medium access control signaling.

By taking the propagation delay from the donor AP to the relay AP into account, the timing advance offset for the UE can be set as appropriate, thereby avoiding the potential random access failure.

In an embodiment, the backhaul link between the relay AP 500 and the donor AP goes through one or more intermediate relay APs. As such, the first determining unit 520 is adapted to calculate an accumulated propagation delay from the first propagation delay information, and determine the timing advance offset as twice of the accumulated propagation delay.

In order to determine the timing advance offset for the UE more accurately, it is desirable to taking into account the propagation delay between the relay AP and the UE. In an embodiment, the relay AP 500 is adapted to obtain a second propagation delay information from the relay AP to the UE. In this case, the first determining unit 520 is adapted to determine the timing advance offset for the UE to perform the random access based on the first propagation delay information and the second propagation delay information.

Figure 10:
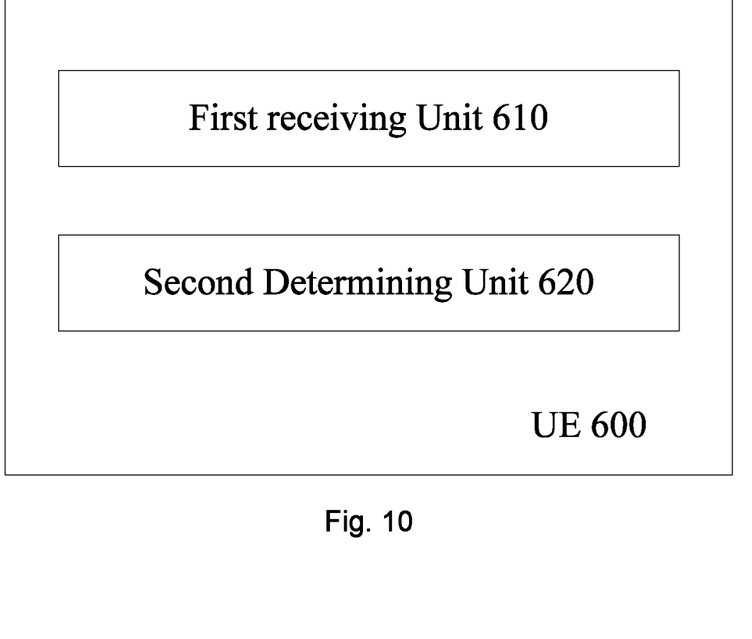
FIG. 10 is a block diagram of a UE configured to time a random access of the UE to the relay AP in accordance with an embodiment.

FIG. 10 is a block diagram of a UE 600 configured to time a random access of the UE to the relay AP in accordance with an embodiment. The UE 600 comprises a first receiving unit 610 and a second determining unit 620. Now the individual units will be described wither respect to FIG. 10.

The first receiving unit 610 is adapted to receive a timing advance offset indication from the relay AP, the timing advance offset is associated with a propagation delay information from the donor AP to the relay AP over the backhaul link.

The second determining unit 620 is adapted to determine a starting time point, within a guard period at a downlink-to-uplink switching point, to perform the random access based on the timing advance offset. Specifically, the second determining unit 620 can determine the starting time point to be the timing advance offset earlier than the predetermined starting time point. That is to say, the random access performed by the UE will start the timing advance offset earlier. This will be accomplished by squeezing the length of the guard period at a downlink-to-uplink switching point, as illustrated in FIG. 4 and FIG. 5.

Figure 11:
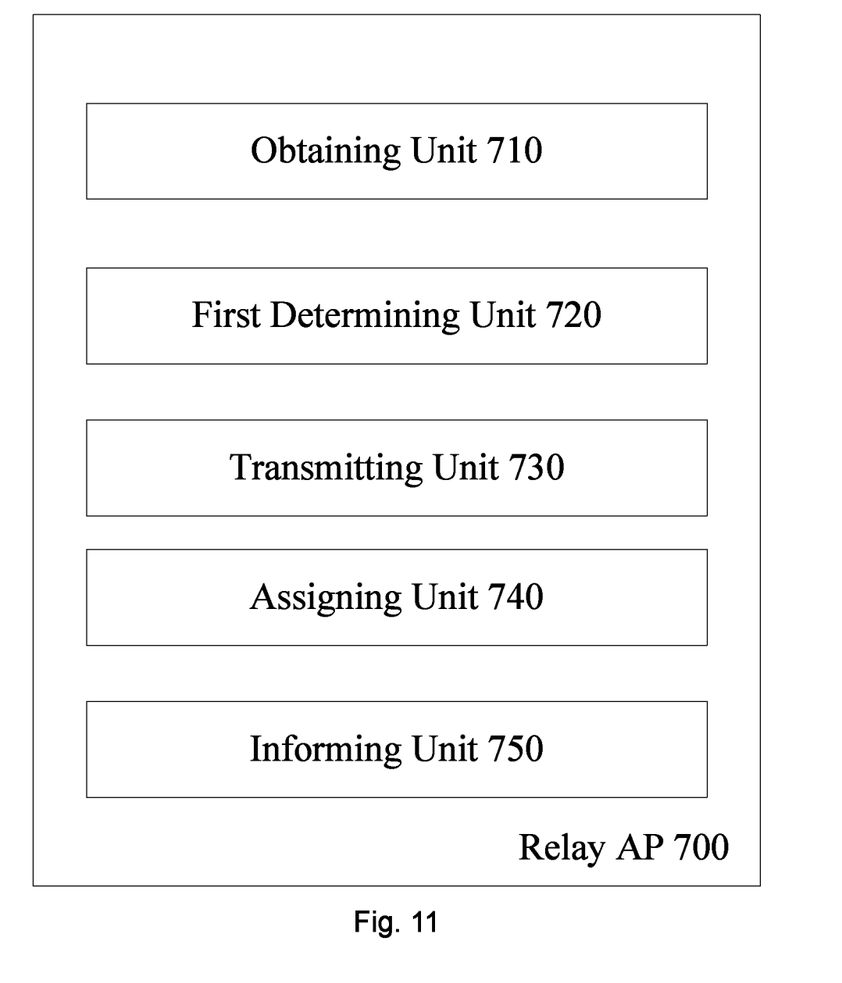
FIG. 11 is a block diagram of a relay AP configured to time a random access of the UE to the relay AP in accordance with an embodiment.
Figure 12:
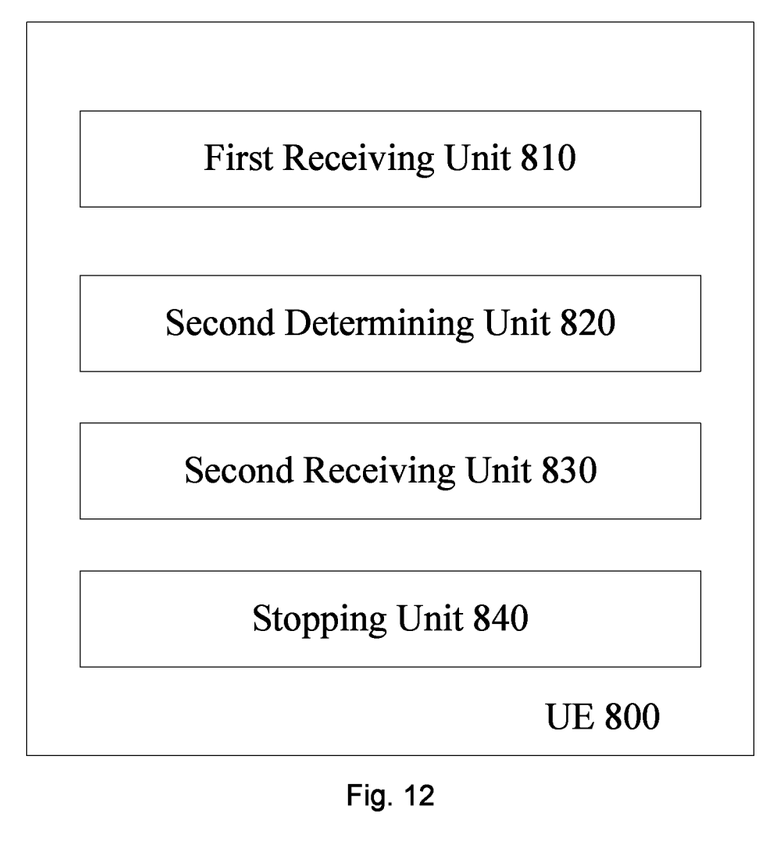
FIG. 12 is a block diagram of a UE configured to time a random access of the UE to the relay AP in accordance with an embodiment

FIG. 11 is a block diagram of a relay AP 700 configured to time a random access of a UE 800 to the relay AP 700, and FIG. 12 is a block diagram of a UE 800 configured to time a random access of the UE 800 to the relay AP 700. The relay AP 700 comprises an obtaining unit 710, a first determining unit 720, a transmitting unit 730, an assigning unit 740 and an informing unit 750. The UE 800 comprises a first receiving unit 810, a second determining unit 820, a second receiving unit 830 and a stopping unit 840. Here, the obtaining unit 710, the first determining unit 720 and the transmitting unit 730 respectively have the same functions as the obtaining unit 510, the first determining unit 520 and the transmitting unit 530 of the relay AP 500 as illustrated in FIG. 9 and will not be described for simplicity. The first receiving unit 810 and the second determining unit 820 respectively have the same functions as the first receiving unit 610 and the second determining unit 620 of the UE 600 as illustrated in FIG. 10 and will not be described for simplicity. Now the other units in the relay AP 700 and the UE 800 will be described with reference to the FIG. 11 and FIG. 12.

When the determined timing advance offset is larger than a length of a guard period for the UE 800 at a downlink-to-uplink switching point, the assigning unit 740 of the relay AP 700 is adapted to assign a time period scheduled for transmitting at least one downlink subframe and/or uplink iii subframe next to the downlink-to-uplink switching point as additional guard period for the UE. Then, the informing unit 750 of the relay AP 700 is adapted to inform the UE 800 of the assignment in step 470.

The second receiving unit 830 of the UE 800 is adapted to receive an indication on occupying a time period scheduled for transmitting at least one downlink subframe and/or uplink subframe next to the downlink-to-uplink switching point as additional guard period. In response to receiving the indication, the stopping unit 840 of the UE is adapted to reset the guard period at the downlink-to-uplink switching point based on the additional guard period and stop receiving the at least one downlink subframe and/or stop performing uplink transmission in the at least one uplink subframe.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

What is claimed is:

1. A method in a relay access point (AP) for timing a random access of a user equipment (UE) to the relay AP in a time division duplex (TDD) radio communication network, the relay AP performing a self-backhaul over a backhaul link to a donor AP, the backhaul link and an random access link between the relay AP and the UE sharing a same frequency resource, comprising:
   obtaining a first propagation delay information from the donor AP to the relay AP over the backhaul link;
   determining a timing advance offset for the UE to perform the random access at least based on the first propagation delay information;
   transmitting the timing advance offset to the UE;
   when the determined timing advance offset is larger than a length of a guard period for the UE at a downlink-to-uplink switching point, assigning a time period scheduled for transmitting at least one downlink subframe and/or uplink subframe next to the downlink-to-uplink switching point as additional guard period for the UE; and
   informing the UE of the assignment.

2. The method of claim 1, wherein the backhaul link between the relay AP and the donor AP goes through one or more relay APs, the determining step comprises:
   calculating an accumulated propagation delay from the first propagation delay information; and
   determining the timing advance offset as twice of the accumulated propagation delay.

3. The method of claim 1, further comprising obtaining a second propagation delay information from the relay AP to the UE, wherein the determining step comprises determining the timing advance offset for the UE to perform the random access based on the first propagation delay information and the second propagation delay information.

4. The method of claim 1, wherein the timing advance offset is transmitted in an access information table, a radio resource control signaling or a medium access control signaling.

5. The method of claim 1, wherein the relay AP is a mobile AP, the method further comprises updating the timing advance offset to UE by periodically repeating the obtaining, determining, and transmitting steps therein.

6. A relay access point (AP) configured to time a random access of a user equipment (UE) to the relay AP in a time division duplex (TDD) radio communication network, the relay AP performing a self-backhaul over a backhaul link to a donor AP, the backhaul link and an random access link between the relay AP and the UE sharing a same frequency resource, comprising a processor and a memory, said memory containing instructions executable by said processor whereby said relay AP is operative to:
   obtain a first propagation delay information from the donor AP to the relay AP over the backhaul link;
   determine a timing advance offset for the UE to perform the random access at least based on the first propagation delay information;

transmit the timing advance offset to the UE;
when the determined timing advance offset is larger than a length of a guard period for the UE at a downlink-to-uplink switching point, assigning a time period scheduled for transmitting at least one downlink subframe and/or uplink subframe next to the downlink-to-uplink switching point as additional guard period for the UE; and
inform the UE of the assignment.

7. The relay AP according to claim 6, wherein the backhaul link between the relay AP and the donor AP goes through one or more relay APs, the relay AP is operative to:
calculating an accumulated propagation delay from the first propagation delay information; and
determining the timing advance offset as twice of the accumulated propagation delay.

8. The relay AP according to claim 6, further operative to:
obtain a second propagation delay information from the relay AP to the UE, wherein the second propagation delay information is also a base to determine the timing advance offset for the UE to perform the random access.

9. The relay AP according to claim 6, further operative to:
obtain a second propagation delay information from the relay AP to the UE, wherein the second propagation delay information is also a base to determine the timing advance offset for the UE to perform the random access.

10. The relay AP according to claim 6, wherein the timing advance offset is transmitted in an access information table, a radio resource control signaling or a medium access control signalling.

11. The relay AP according to claim 6, wherein the relay AP is a mobile AP, the relay AP is further operative to date the timing advance offset to the UE by periodically repeating the obtain, determine, and transmit steps configured therein.

12. A user equipment (UE) configure to time a random access to a relay access point (AP) in a time division duplex (TDD) radio communication network, the relay AP performing a self-backhaul over a backhaul link to a donor AP, the backhaul link and an random access link between the relay AP and the UE sharing a same frequency resource, comprising a processor and a memory, said memory containing instructions executable by said processor whereby said UE is operative to:
receive a timing advance offset from the relay AP, the timing advance offset being associated with a propagation delay information from the donor AP to the relay AP over the backhaul link;
determine a starting time point, within a guard period at a downlink-to-uplink switching point, to perform the random access based on the timing advance offset;
receive an indication on occupying a time period scheduled for transmitting at least one downlink subframe and/or uplink subframe next to the downlink-to-uplink switching point as additional guard period; and
in response to receiving the indication, reset the guard period at the downlink-to-uplink switching point based on the additional guard period and stopping receiving the at least one downlink subframe and/or performing uplink transmission in the at least one uplink subframe.

* * * * *